(12) United States Patent
Igarashi et al.

(10) Patent No.: US 11,117,466 B2
(45) Date of Patent: Sep. 14, 2021

(54) OPERATION DEVICE AND VEHICULAR SHIFTING APPARATUS USING OPERATION DEVICE

(71) Applicant: ALPS ALPINE CO., LTD., Tokyo (JP)

(72) Inventors: Yu Igarashi, Miyagi (JP); Takashi Uenomachi, Miyagi (JP); Toshio Ogawa, Miyagi (JP); Yoshitsugu Wakita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 299 days.

(21) Appl. No.: 16/393,014

(22) Filed: Apr. 24, 2019

(65) Prior Publication Data

US 2019/0248235 A1    Aug. 15, 2019

Related U.S. Application Data

(63) Continuation of application No. PCT/JP2017/038356, filed on Oct. 24, 2017.

(30) Foreign Application Priority Data

Nov. 29, 2016    (JP) .............................. JP2016-230914

(51) Int. Cl.
    *B60K 20/02*    (2006.01)
    *B60K 26/02*    (2006.01)
    (Continued)

(52) U.S. Cl.
    CPC ............ *B60K 20/02* (2013.01); *B60K 26/021* (2013.01); *B60K 35/00* (2013.01);
    (Continued)

(58) Field of Classification Search
    CPC ...... B60K 20/02; B60K 26/021; B60K 35/00; F16H 59/02; F16H 59/0278;
    (Continued)

(56) References Cited

U.S. PATENT DOCUMENTS 10,088,036 B2 * 10/2018 Uenomachi ............ G05G 9/047
10,753,457 B2 *  8/2020 Uenomachi ............ B60K 20/02
(Continued)

FOREIGN PATENT DOCUMENTS

EP    2891835 A1 *  7/2015 ............... G05G 5/05
EP    2902665 A1 *  8/2015 ............. F16H 59/02
(Continued)

OTHER PUBLICATIONS

Machine translation of JP 2002-254949 A obtained on Apr. 12, 2021.*

(Continued)

*Primary Examiner* — Adam D Rogers
(74) *Attorney, Agent, or Firm* — IPUSA, PLLC

(57) ABSTRACT

An operation device includes a support for pivotally supporting a shift lever, a first movable member configured to be pivotally operated from home position in a direction in conjunction with the shift lever, a pair of permanent magnets supported, at an operation reference position, by the support (Continued)

so as to be opposite the first magnetic body, and first plate springs for biasing the first movable member in a direction in which the first magnetic body moves toward the permanent magnets.

8 Claims, 12 Drawing Sheets

(51) Int. Cl.
*G05G 1/04* (2006.01)
*F16H 59/02* (2006.01)
*G05G 5/03* (2008.04)
*B60K 35/00* (2006.01)
*F16H 61/02* (2006.01)
*G05G 9/047* (2006.01)
*F16H 59/04* (2006.01)

(52) U.S. Cl.
CPC ..... *F16H 59/0278* (2013.01); *F16H 61/0204* (2013.01); *G05G 1/04* (2013.01); *G05G 5/03* (2013.01); *F16H 2059/048* (2013.01); *G05G 2009/04766* (2013.01)

(58) Field of Classification Search
CPC ......... F16H 2059/0295; F16H 61/0204; F16H 61/24; F16H 2061/241; F16H 2059/048; G05G 1/04; G05G 2009/04766; G05G 5/03; G05G 5/06
See application file for complete search history.

(56) References Cited

U.S. PATENT DOCUMENTS

| | | | |
|---|---|---|---|
| 10,802,528 B2* | 10/2020 | Furuki | ..................... G05G 5/03 |
| 2002/0056334 A1 | 5/2002 | Fujinuma | |
| 2019/0285170 A1* | 9/2019 | Igarashi | ................. F16H 61/24 |

FOREIGN PATENT DOCUMENTS

| | | | | |
|---|---|---|---|---|
| EP | 3096198 | | 11/2016 | |
| EP | 3098686 A2 * | | 11/2016 | ........... F16H 59/105 |
| JP | 2002-144905 | | 5/2002 | |
| JP | 2002254949 A * | | 9/2002 | |
| JP | 2012-216113 | | 11/2012 | |
| JP | 2016-024763 | | 2/2016 | |
| WO | WO-2019009102 A1 * | | 1/2019 | ............... G05G 5/03 |
| WO | WO-2019013048 A1 * | | 1/2019 | ............... G05G 5/05 |
| WO | WO-2019138645 A1 * | | 7/2019 | ............... G05G 5/06 |

OTHER PUBLICATIONS

International Search Report dated Jan. 23, 2018, for PCT/JP2017/038356 filed on Oct. 24, 2017.

* cited by examiner

OPERATION DEVICE AND VEHICULAR SHIFTING APPARATUS USING OPERATION DEVICE

CROSS-REFERENCE TO RELATED APPLICATION

This application is a continuation application of International Application No. PCT/JP2017/038356 filed on Oct. 24, 2017, and designated the U.S., which is based upon and claims the benefit of priority of the prior Japanese Patent Application No. 2016-230914, filed on Nov. 29, 2016, the entire contents of which are incorporated herein by reference.

BACKGROUND OF THE INVENTION

1. Field of the Invention

The present disclosure relates to an operation device a vehicular shifting apparatus.

2. Description of the Related Art

In general, an operation device, in which an operation member is moved to a plurality of positions by a pivotal operation of an operation member, is used by a remote controller of various electric devices such as a television set and a video device, an input device of a game system, a vehicular shifting apparatus or the like. For the vehicular shifting apparatus, in order to improve a click feeling given when an operation member is pivotally shifted, the operation member is pivotally shifted with the click feeling.

Japanese Laid-open Patent Publication No. 2002-144905 (Patent Document 1) discloses a shift manipulating device for an automatic transmission in which a shift lever used as an operation member is pivotally shifted with a click feeling.

In the shift manipulating device for the automatic transmission, when the shift lever supported by a holder is swingably operated, the shift lever is operably moved to each position of a P range (Parking range), R range (Reverse range), N range (Neutral range) and a D range (Drive range).

When the shift lever is swingably operated, a control body provided on a holder is pressed to a control groove formed in a bottom portion of the holder, by a control spring (coil spring). The control body is pressed to the control groove by a biasing force of the control spring, so that the click feeling is given when the shift lever is moved to each position.

However, in the techniques disclosed in Patent Document 1, in order to provide the click feeling, the control body is configured to slide with respect to the control groove. If the shift lever is repeatedly operated to be swung, this may result in a durability problem such as abrasion of the control groove or the control spring, deterioration of spring properties of the control spring, or a backlash in the control spring and the control body.

SUMMARY OF THE INVENTION

An operation device according to an embodiment of the present disclosure includes an operation member and a support for pivotally supporting the operation member, and in which the operation member is pivotally shifted to a predetermined position with a click feeling, the operation device including a first movable member supported by the support so as to interlock with a pivotal motion of the operation member, a first magnetic body provided with the first movable member, a permanent magnet supported by the support so as to oppose the first magnetic body when the operation member is at an operation reference position of the operation member, and an elastic member for biasing the first movable member in a direction in which the first magnetic body moves toward the permanent magnet, and wherein the operation member is supported at the operation reference position by an attraction force acting between the first magnetic body and the permanent magnet when the operation member is at the operation reference position, and wherein the movable member positions the first magnetic body away from the permanent magnet against the attraction force acting between the first magnetic body and the permanent magnet as well as a biasing force of the elastic member when the operation member is pivotally shifted to a first step position, so that the operation member is pivotally shifted to a predetermined position.

DESCRIPTION OF THE PREFERRED EMBODIMENTS

Figure 1:
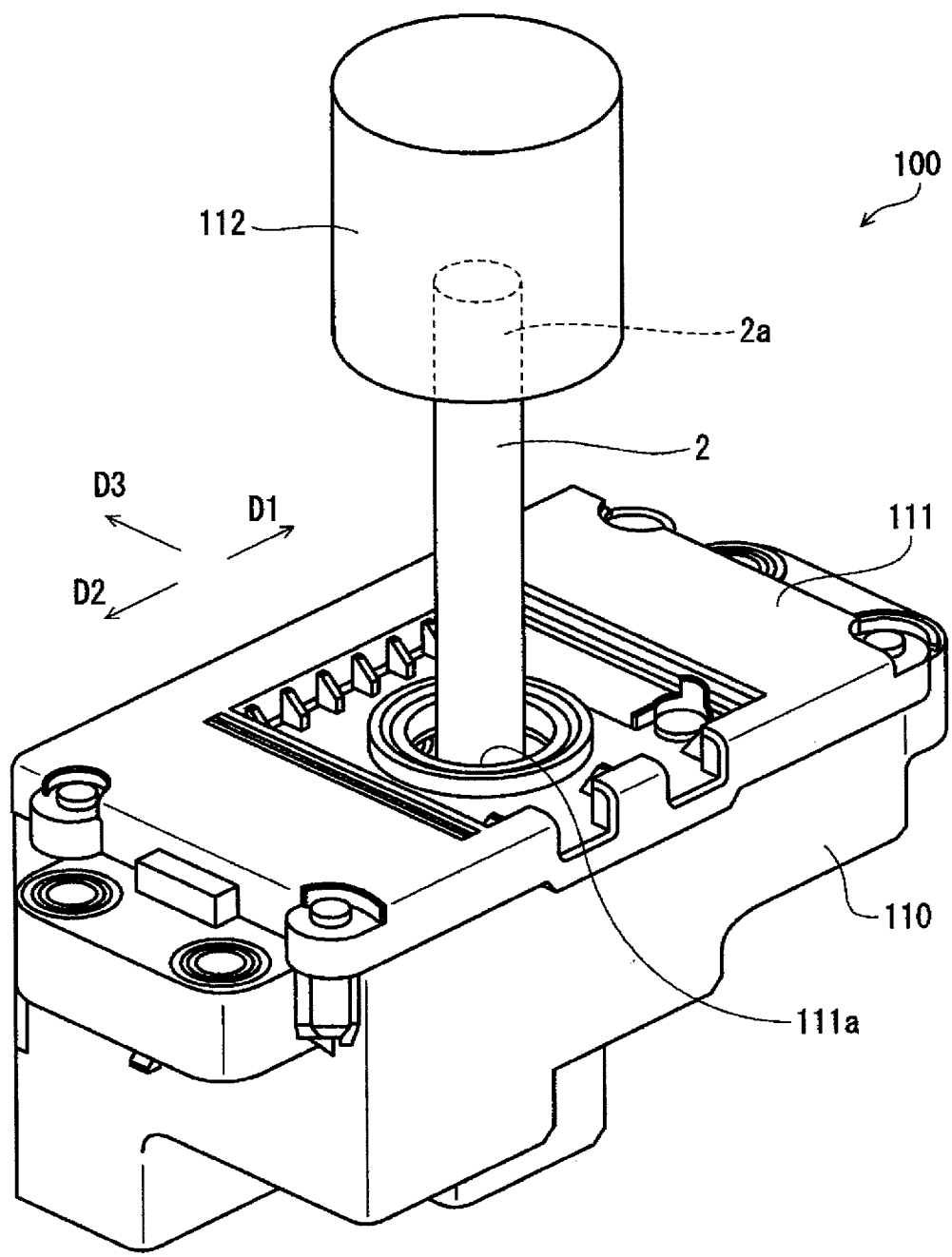
FIG. 1 is an external perspective view of a vehicular shift apparatus according to one embodiment of the present invention.
Figure 2:
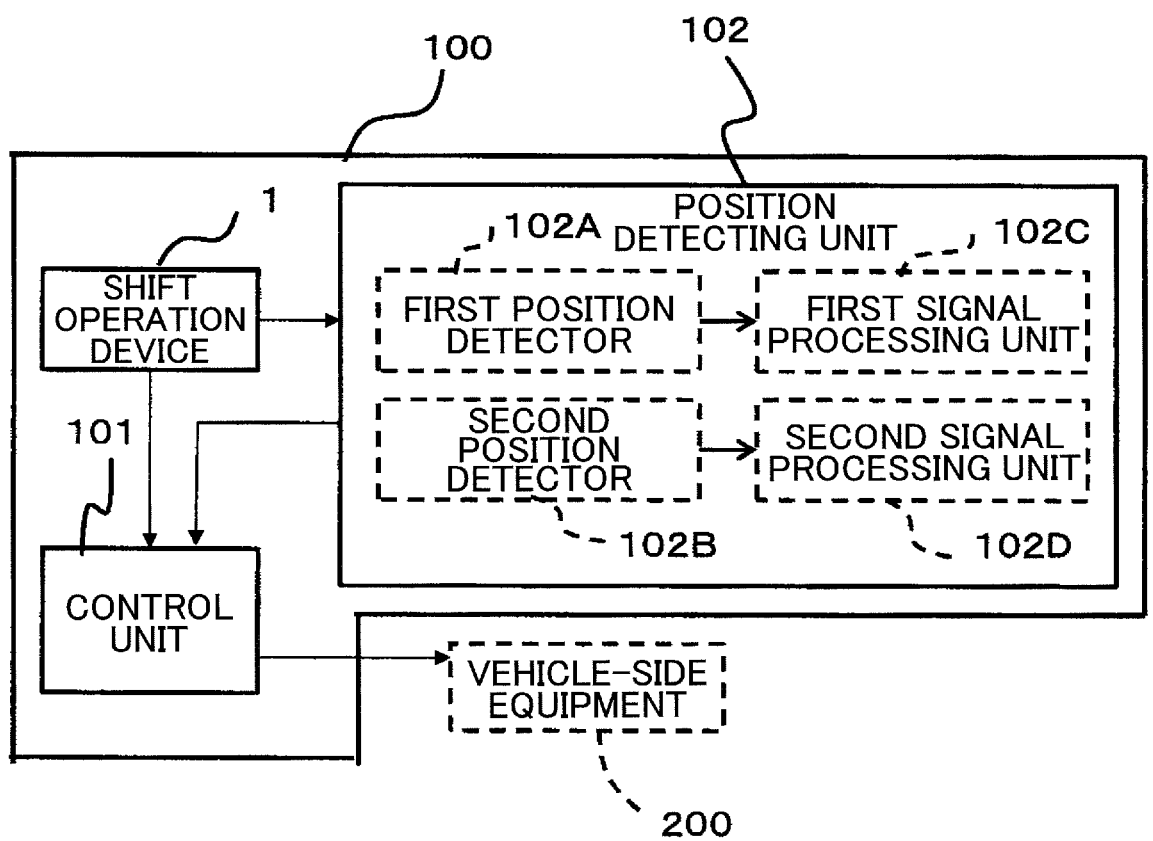
FIG. 2 is a block diagram illustrating a configuration of the vehicular shift apparatus illustrated in FIG. 1.
Figure 3:
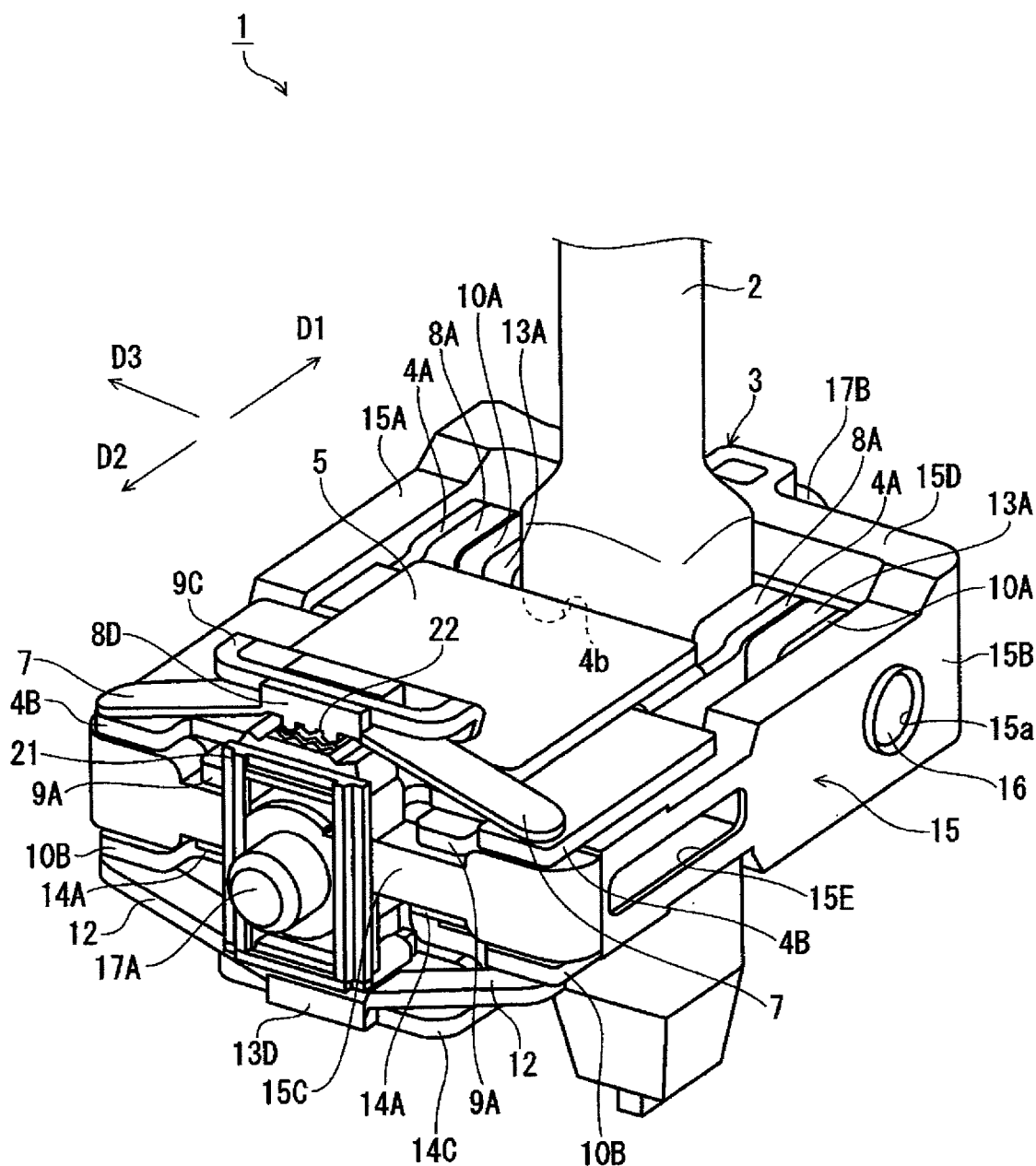
FIG. 3 is an external perspective view of a shift operation device of the vehicular shift apparatus illustrated in FIG. 1.
Figure 4:
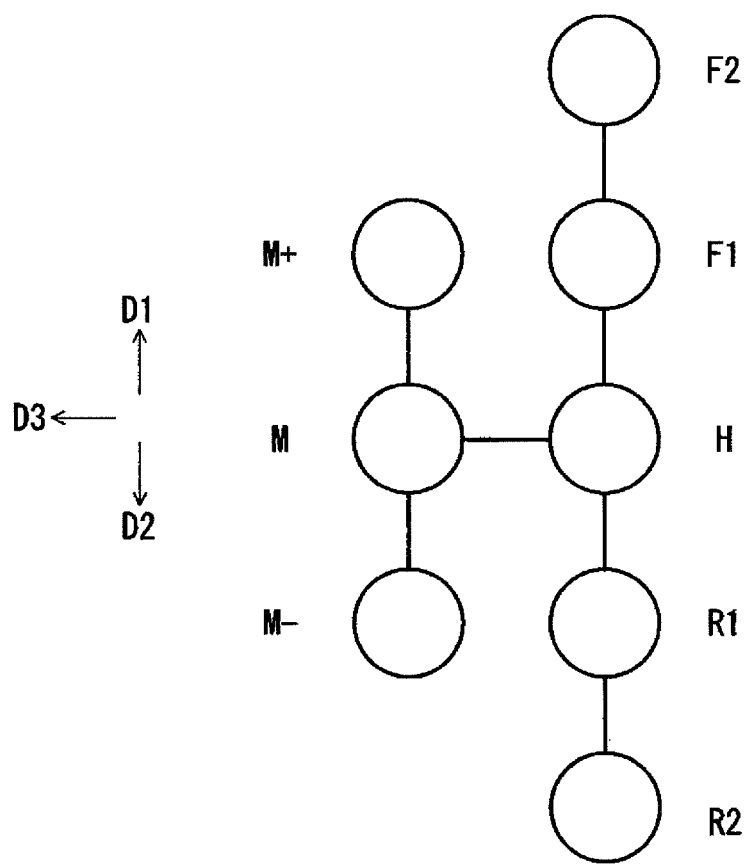
FIG. 4 is a diagram for explaining each position of a shift lever of the shift operation device illustrated in FIG. 3.
Figure 5:
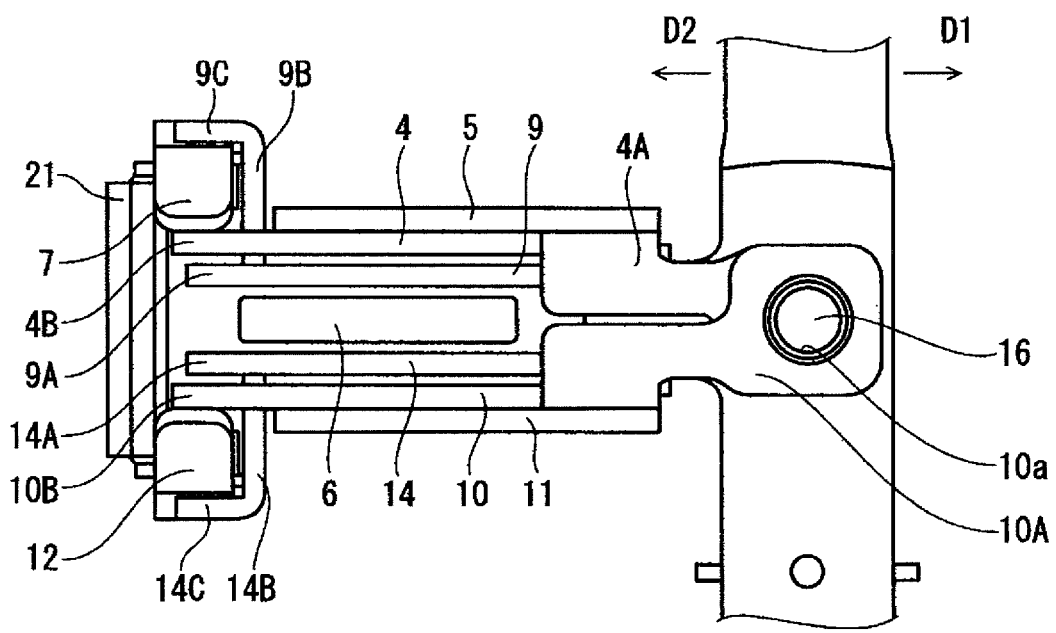
FIG. 5 is a side view of a main part of the shift operation device illustrated in FIG. 3.
Figure 6:
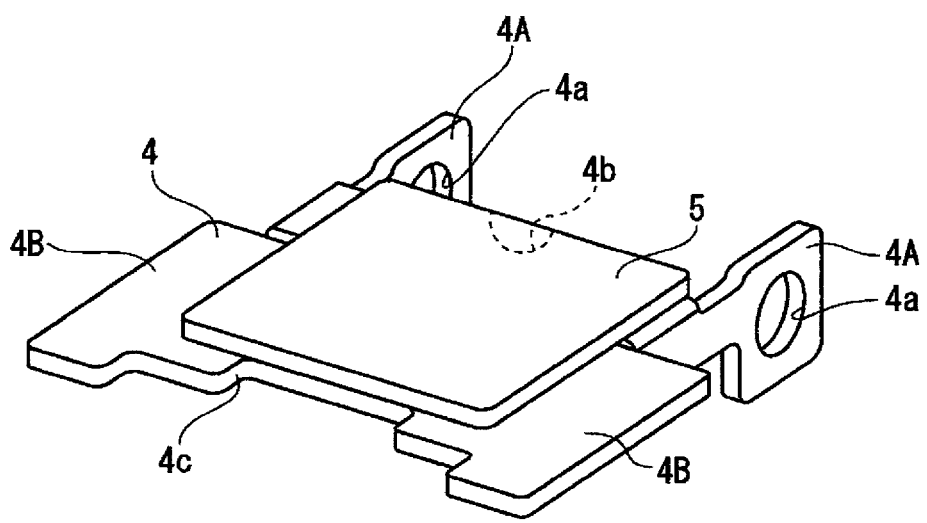
FIG. 6 is a perspective view of a first movable member of the shift operation device illustrated in FIG. 3.
Figure 7:
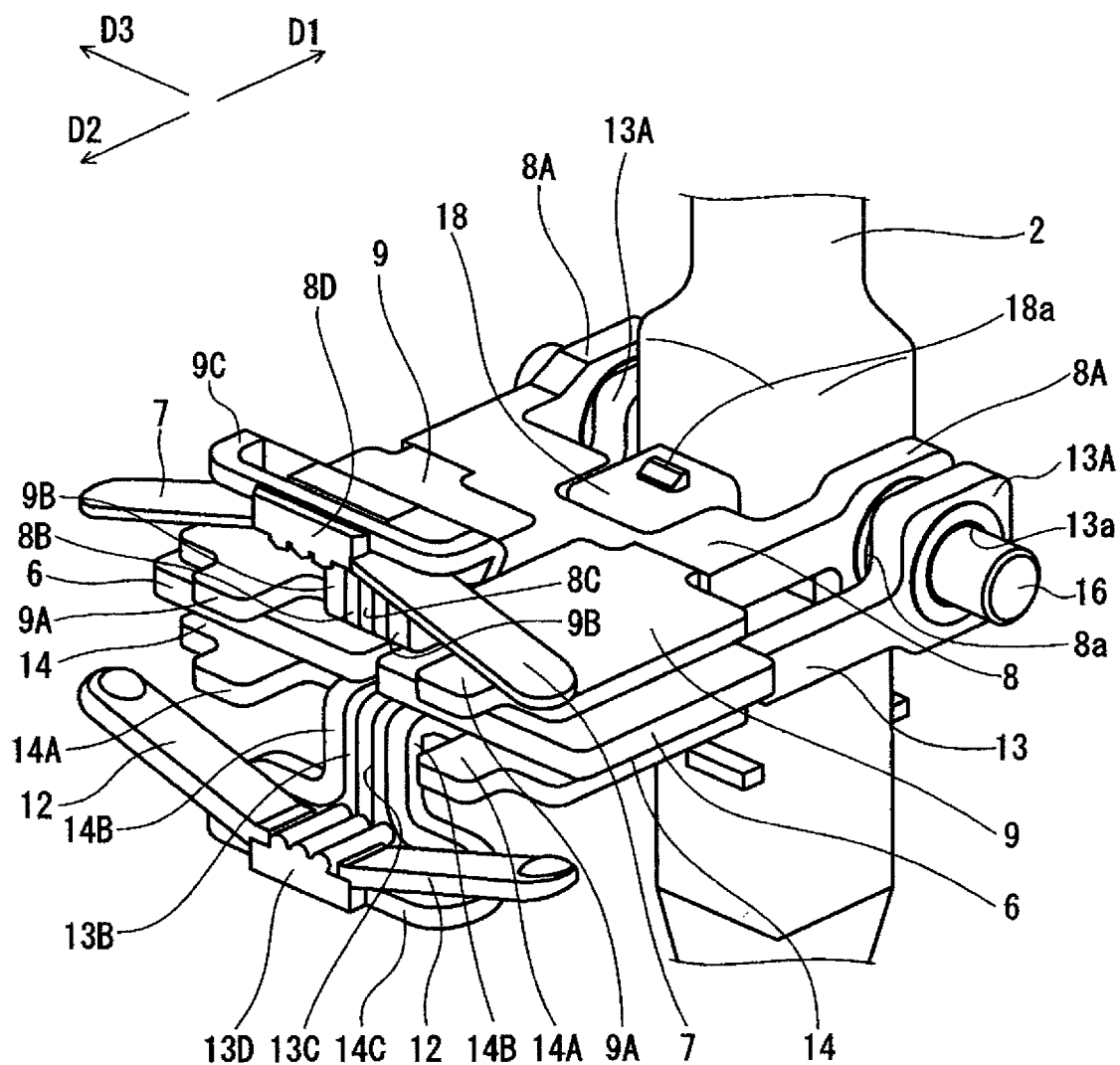
FIG. 7 is a perspective view of a second movable member and a fourth movable member of the shift operation device illustrated in FIG. 3.
Figure 8:
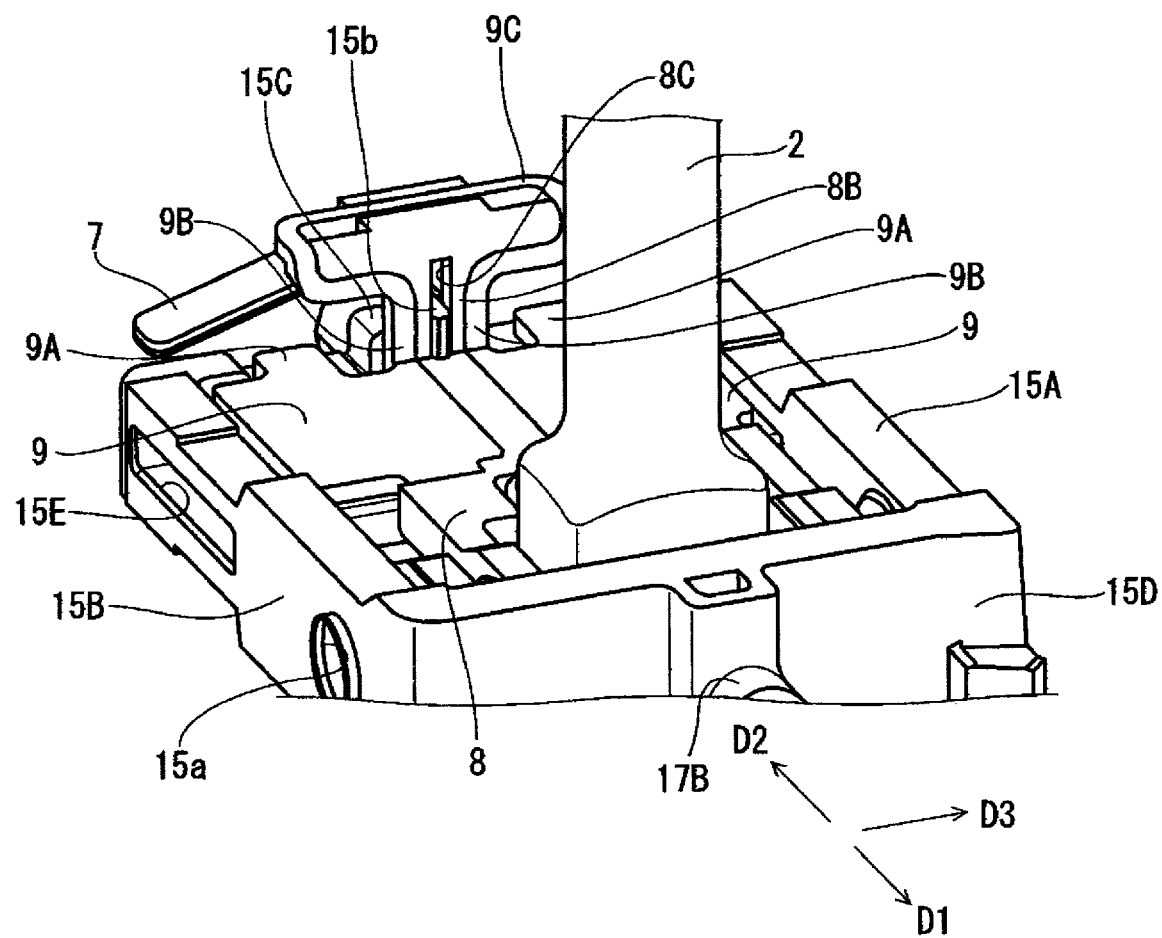
FIG. 8 is a perspective view of a state in which the second movable member illustrated in FIG. 5 is supported by a support.
Figure 9:
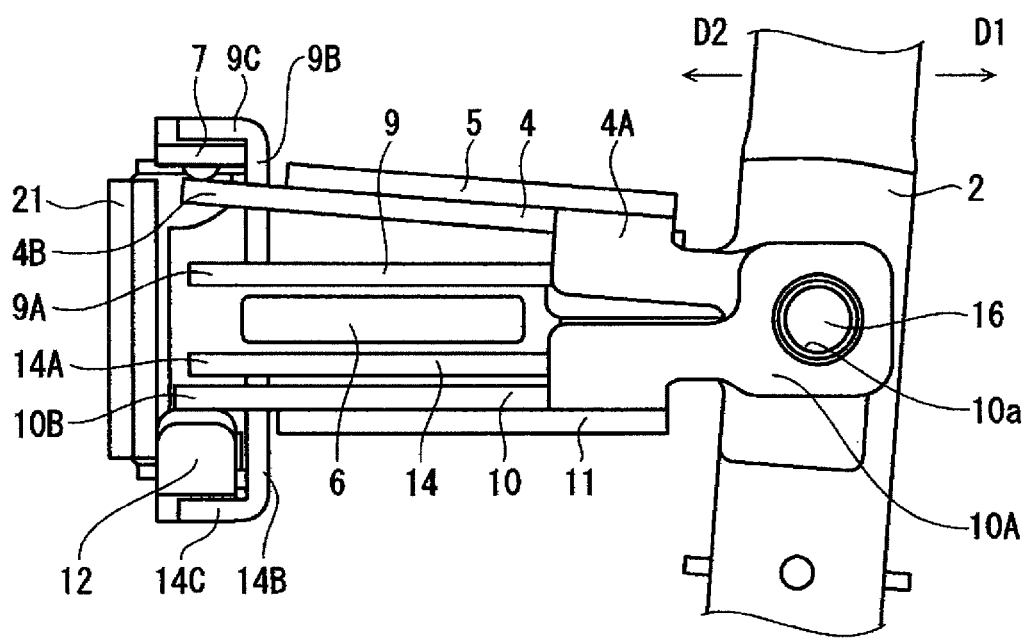
FIG. 9 is a side view of a main part of a state in which the first movable member illustrated in FIG. 5 is pivotally shifted.
Figure 10:
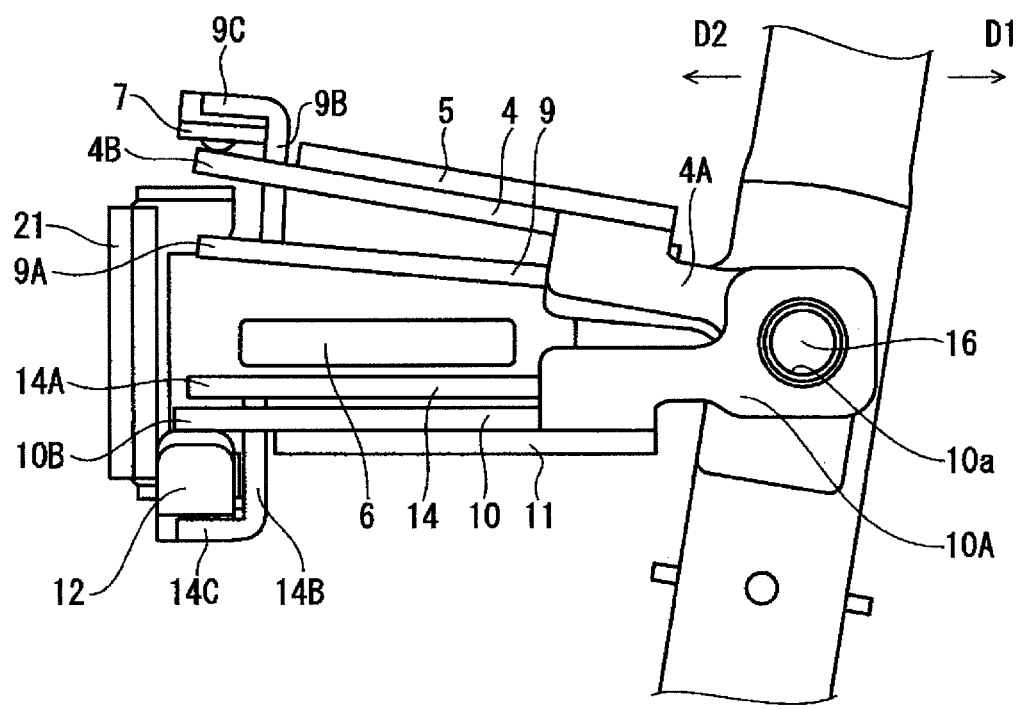
FIG. 10 is a side view of a main part of a state in which the second movable member illustrated in FIG. 9 is pivotally shifted.
Figure 11:
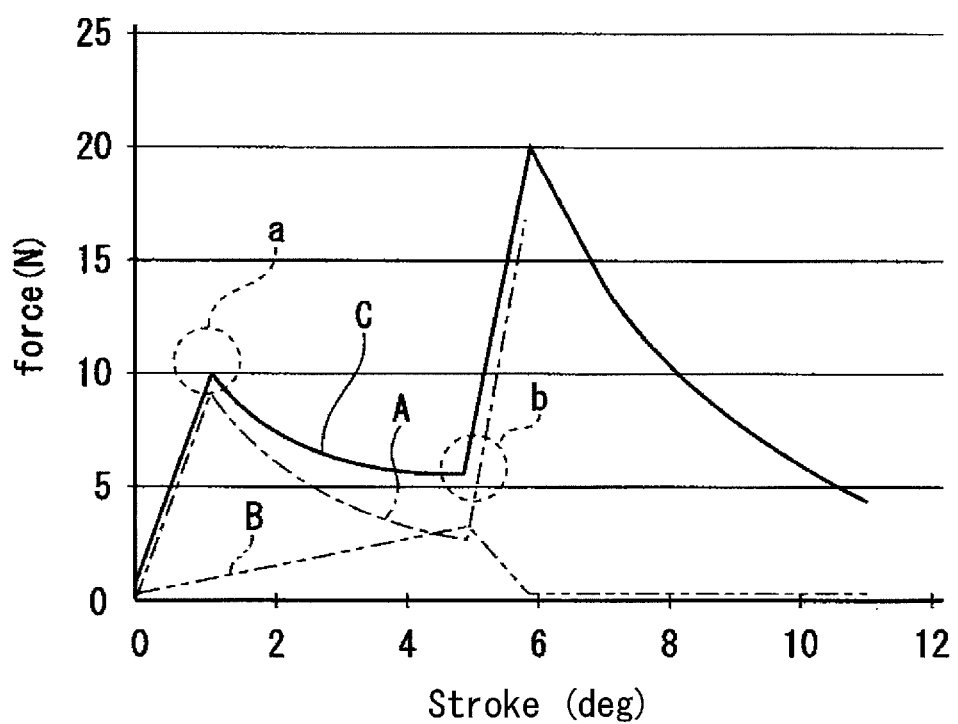
FIG. 11 is a chart for explaining an operation load applied on the shift lever.
Figure 12:
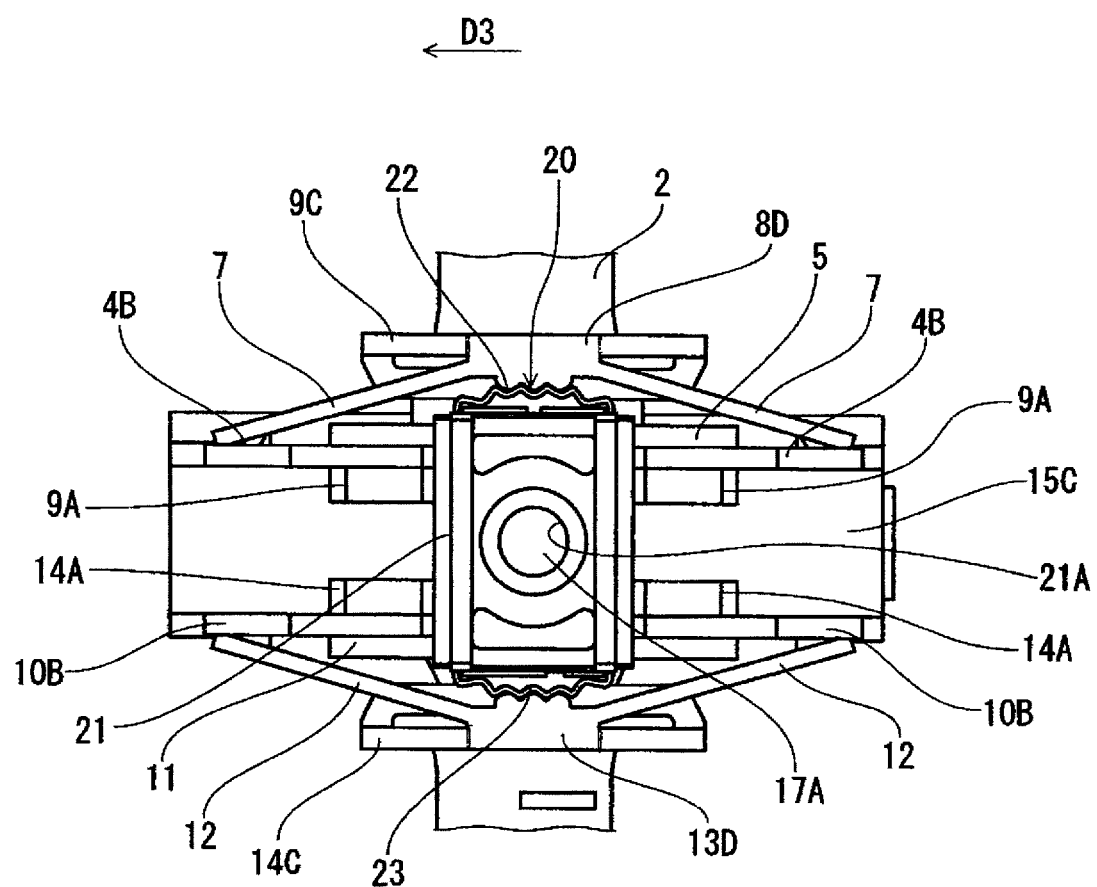
FIG. 12 is a front view of the shift operation device illustrated in FIG. 3.

With reference to the drawings, explanation will be provided hereinafter for an operation device and a vehicular shifting apparatus using the operation device according to embodiments of the present invention. FIG. 1 is an external perspective view of a vehicular shift apparatus according to one embodiment of the present invention. FIG. 2 is a block diagram illustrating a configuration of the vehicular shift apparatus illustrated in FIG. 1. FIG. 3 is an external perspective view of a shift operation device of the vehicular shift apparatus illustrated in FIG. 1. FIG. 4 is a diagram for explaining each positon of a shift lever of the shift operation device illustrated in FIG. 3. FIG. 5 is a side view of a main part of the shift operation device illustrated in FIG. 3. FIG. 6 is a perspective view of a first movable member of the shift operation device illustrated in FIG. 3. FIG. 7 is a perspective view of a second movable member and a fourth movable member of the shift operation device illustrated in FIG. 3. FIG. 8 is a perspective view of a state in which the second movable member illustrated in FIG. 5 is supported by a support. FIG. 9 is a side view of a main part of a state in which the first movable member illustrated in FIG. 5 is pivotally shifted. FIG. 10 is a side view of a main part of a state in which the second movable member illustrated in FIG. 9 is pivotally shifted. FIG. 11 is a chart for explaining an operation load applied on the shift lever. FIG. 12 is a front view of the shift operation device illustrated in FIG. 3. Note that in the figures, a direction of an arrow D1 indicates a first pivotal direction of the shift lever, a direction of an arrow D2 indicates a second pivotal direction of the shift lever, and a direction of an arrow D3 indicates a third pivotal direction of the shift lever.

Vehicular Shifting Apparatus

As illustrated in FIGS. 1 to 4, a vehicular shifting apparatus 100 includes a shift operation device 1 that is an operation device, a control unit 101 that receives a signal from the shift operation device 1 to transmit a signal to a vehicle-side equipment 200, and a position detecting unit 102 that detects a plurality of positions to which a shift lever 2, which is an operation member of the shift operation device 1, is pivotally shifted.

The vehicular shifting apparatus 100 includes a case body 110 and a cover 111 for covering an opening on an upper portion of the case body 110. The case body 110 houses the shift operation device 1 that is the operation device.

The case body 110 is formed by injection molding of a resin material such as polybutylene terephthalate (PBT).

The cover 111 is formed by injection molding of resin such as polybutylene terephthalate (PBT), as with the case of the case body 110. A circle hole 111a is formed in a central portion of the cover 111, and a shift lever 2 that is the operation member is inserted through the hole 111a. A front end 2a of the shift lever 2 is protruded from an upper surface of the cover 111. A shift knob 112 for pivotally shifting the shift lever 2 is mounted on the front end 2a of the shift lever 2.

The shift knob 112 is formed of resin such as acrylonitrile butadiene styrene (ABS) resin.

The vehicular shifting apparatus 100 does not employ a mechanical control system in which the shift knob 112 is directly connected to a transmission, but employs a shift-by-wire system. For the vehicular shifting apparatus 100 with the shift-by-wire system, since a mechanical structure such as a link mechanism is not required, the size can be decreased. Accordingly, a layout of the vehicular shifting apparatus 100 can be flexible in a vehicle. Also, since the shift lever 2 can be operated with a relatively small force, a shift change operation can be easily performed.

The vehicular shifting apparatus 100 includes a control unit 101 coupled to the vehicle-side equipment, and the position detecting unit that detects an operation position of the shift lever 2 provided with the shift operation device.

The control unit 101 transmits a position information signal of each operation position, to which the shift lever 2 is pivotally shifted, to the vehicle-side equipment 200. In response to receiving the position information signal, the vehicle-side equipment 200 operates according to a shift pattern, and displays an operation position in the shift pattern of shift lever 2 on a display unit provided with an instrument panel or the like.

The position detecting unit 102 includes a first position detector 102A for detecting a plurality of positions when the shift lever 2 is pivotally shifted in a first pivotal direction (D1 direction) or a second pivotal direction (D2 direction), and a second position detector 102B for, when the shift lever 2 is pivotally shifted in a third pivotal direction (D3 direction), detecting its position. The first position detector 102A and the second position detector 102B are housed within the case body 110. Note that the first position detector 102A is engaged with a first pivotal shaft 16 in the support 3 described below to detect a rotation angle of the first pivotal shaft 16. Also, the second position detector 102B is engaged with shaft members 17A and 17B that constitute a second pivotal shaft in the support described below to detect a rotation angle of a shaft member 17.

The position detecting unit 102 includes a first signal processing unit 102C and a second signal processing unit 102D, which process detection signals transmitted from the first position detector 102A and the second position detector 102B. The first signal processing unit 102C calculates a rotation angle of the first pivotal shaft 16 based on a signal transmitted from the first position detector 102A, and detects a movement in the first pivotal direction (D1 direction) or the second pivotal direction (D2 direction) with respect to the shift lever 2 based on the calculated rotation angle. Similarly, the second signal processing unit 102D calculates rotation angles of the shaft members 17A and 17B based on a signal transmitted from the second position detector 102B, and detects a movement in a third pivotal direction (D3 direction) with respect to the shift lever 2 based on the calculated rotation angle. Based on moving information of the detected shift lever 2, the position information signal of each operation position is transmitted to the vehicle-side equipment 200 by the control unit 101.

Next, with reference to FIG. 4, explanation will be provided for a shift operation of the vehicular shifting apparatus 100. Note that FIG. 4 is a diagram of a display device that displays which position state is currently set for a driver by lighting or the like.

At an initial state in which the shift lever 2 is approximately vertically supported at an operation reference position, when the shift lever 2 is pivotally shifted in the first pivotal direction (D1 direction), a position state of the vehicle shifts from a position H to a position F1. The position F1 is the first step position F1 in the first pivotal direction (D1 direction). When the shift lever 2 is further pivotally shifted in the first pivotal direction (D1 direction), the position state of the vehicle shifts from the position F1 to a position F2. The position F2 is the second step position F2 in the first pivotal direction (D1 direction). In a case where a pivotal operation is completed, if an operator releases the hand, the shift lever 2 automatically returns to the operation reference position and is supported approximately vertically. Thereby, the position state of the vehicle is maintained at F2.

At the state of the second step position F2, when the shift lever 2 is pivotally shifted in the second pivotal direction (D2 direction), the position state of the vehicle returns to the first step position F1 or the position H. In a case where the pivotal operation is completed, if the operator releases the hand, the shift lever 2 automatically returns to the operation reference position and is supported approximately vertically. Thereby, the position state of the vehicle is maintained at F1 or H.

At the initial state in which the shift lever 2 is approximately vertically supported at the operation reference position, when the shift lever 2 is pivotally shifted in the second pivotal direction (D2 direction), the position state of the vehicle shifts from the position H to a position R1. The position R1 is the first step position R1 in the second pivotal direction (D2 direction). When the shift lever 2 is further pivotally shifted in the second pivotal direction (D2 direction), the position state of the vehicle shifts from the position R1 to a position R2. The position R2 is the second step position R2 in the second pivotal direction (D2 direction). In a case where the pivotal operation is completed, if the operator releases the hand, the shift lever 2 automatically returns to the operation reference position and is supported approximately vertically. Thereby, the position state of the vehicle is maintained at R2.

At the state of the second step position R2, when the shift lever 2 is pivotally shifted in the first pivotal direction (D1 direction), the position state of the vehicle returns to the position R1 or the position H. In a case where the pivotal operation is completed, if the operator releases the hand, the shift lever 2 automatically returns to the operation reference position and is supported approximately vertically. Thereby, the position state of the vehicle is maintained at R1 or H.

Next, when the shift lever 2 is pivotally shifted from the operation reference position in the third pivotal direction (D3 direction), the position state of the vehicle shifts from the position H to the position M. In a case where the pivotal operation is completed, even if the operator releases the hand, the shift lever 2 is supported at a location (a location for the position M) placed in the third direction (D3 direction). In the vehicle, when the shift lever 2 is pivotally shifted from the state of the position M in the first direction (D1 direction), the position state of the vehicle shifts from a position M to a position M+. In a case where the pivotal operation is completed, if the operator releases the hand, the shift lever 2 automatically returns to a position for the position M to be supported, so that the position state of the vehicle is maintained at M+.

At the state of the position M with respect to the vehicle, when the shift lever 2 is pivotally shifted in the second pivotal direction (D2 direction), the position state of the vehicle returns from the position M to M−. In a case where the pivotal operation is completed, if the operator releases the hand, the shift lever 2 automatically returns to the location for the position M to be supported, so that the position state of the vehicle is maintained at M+.

When the shift lever 2 is pivotally shifted from the location for the position M in the operation reference position direction (a direction opposite to the D3 direction), the position state of the vehicle shifts from the position M to the position H, and the shift lever 2 is approximately vertically supported at the operation reference position.

As illustrated in FIGS. 3, 5 to 7, the shift operation device 1 includes the shift lever 2, a support 3 for pivotally supporting the shift lever 2, and a first movable member 4 that is pivotally operated from the operation reference position in the first pivotal direction (D1 direction) so as to interlock with the shift lever 2. The shift operation device 1 also includes a first magnetic body 5 provided with the first movable member 4, and a pair of permanent magnets 6 and 6 that is supported at the operation reference position by the support 3 so as to be opposite the first magnetic body 5. The shift operation device 1 further includes a pair of first plate springs 7 and 7 that is a first elastic member for biasing the first magnetic body 5 in a direction in which the first magnetic body 5 moves toward the permanent magnets 6 and 6, a second movable member 8 that is disposed between the first movable member and the permanent magnets 6 and 6 and further is pivotally operated in the first pivotal direction (D1 direction) in conjunction with the shift lever 2, and a pair of second magnetic bodies 9 and 9 provided with the second movable member 8.

In a case where the shift lever 2 is at the operation reference position, the first magnetic body 5 and the second magnetic bodies 9 and 9 are close together and are disposed in the first pivotal direction (D1 direction) with respect to the permanent magnets 6 and 6. Further, the first magnetic body 5 and the second magnetic bodies 9 and 9 are attracted by the permanent magnets 6 and 6.

Also, the shift operation device 1 includes a third movable member 10 that interposes the permanent magnets 6 and 6 and is disposed on an opposite side of the first movable member 4 and further is pivotally shifted from the operation reference position in the second pivotal direction (D2 direction) in conjunction with the shift lever 2. The shift operation device 1 also includes a third magnetic body 11 provided on the third movable member 10, a pair of second plate springs 12 and 12 that is a second elastic member for biasing the third magnetic body 11 in a direction that is closer to the permanent magnets 6 and 6. The shift operation device 1 further includes a fourth movable member 13 that is disposed between the third movable member 10 and the permanent magnets 6 and 6 and further is pivotally operated in the second pivotal direction (D2 direction) in conjunction with the shift lever 2, and a pair of fourth magnetic bodies 14 and 14 provided with the fourth movable member 13.

In a case where the shift lever 2 is at the operation reference position, the third magnetic body 11 and the fourth magnetic bodies 14 and 14 are closer together and are disposed in the second pivotal direction (D2 direction) with respect to the permanent magnets 6 and 6. Thus, the third magnetic body 11 and the fourth magnetic bodies 14 and 14 are attracted by the permanent magnets 6 and 6.

Note that a configuration of the third movable member 10 is the same as that of the first movable member 4, and a configuration of the fourth movable member 13 is the same as that of the second movable member 8. A configuration of the third magnetic body 11 is the same as that of the first magnetic body 5, and a configuration of the fourth magnetic bodies 14 and 14 is the same as that of the second magnetic bodies 9 and 9. A configuration of the first plate springs 7 and 7 is the same as that of the second plate springs 12 and 12.

In view of the point described above, in the following description, configurations of the first movable member 4, the first magnetic body 5, the second movable member 8, the second magnetic bodies 9 and 9, and the first plate springs 7 and 7 are described hereafter. Accordingly, for the third movable member 10, the third magnetic body 11, the fourth movable member 13, the fourth magnetic bodies 14 and 14, and the second plate springs 12 and 12, explanation will be omitted.

(Support)

The support 3 has a rectangular frame 15 that is formed of non-magnetic material such as zinc die-cast. The frame 15 has a first frame section 15A and a second frame section 15B that are opposite to each other, as well as a third frame section 15C and a fourth frame section 15D that are opposed to each other in a direction perpendicular to the first frame section 15A and the second frame section 15B. Upper and lower surfaces of the frame 15 are open. The first frame section 15A and the second frame section 15B have shaft-receiving sections 15$a$ and 15$b$ so as to be opposite to each other. Both end portions of a first pivotal shaft 16 that constitutes part of the support 3 rotatably fit the shaft-receiving sections 15$a$ and 15$b$.

The first movable member 4 is pivotally operated at a center of the first pivotal shaft 16 that is formed of magnetic material such as iron, and thus enables a smooth pivotal operation of the shift lever 2.

A base end side of the shift lever 2 is mounted together with the first pivotal shaft 16 formed of magnetic material such as iron. Both ends of the first pivotal shaft 16 are rotatably supported by the shaft-receiving sections 15a and 15b, so that the shift lever 2 is pivotally shifted in the first pivotal direction (D1 direction) or the second pivotal direction (D2 direction).

In the third frame section 15C and fourth frame section 15D, a pair of shaft members 17A and 17B that constitute part of the support 3 is formed so as to protrude outwardly. The shaft members 17A and 17B are rotatably supported in the case body 110. A second pivotal shaft is constituted by a combination of the shaft members 17A and 17B, so that the shift lever 2 is pivotally shifted in the third pivotal direction (D3 direction).

In such a configuration, the shift lever 2 is pivotally shifted in the first pivotal direction (D1 direction), the second pivotal direction (D2 direction) and the third pivotal direction (D3 direction).

First Movable Member and First Magnetic Body

The first movable member 4 is formed of magnetic material such as iron to have a plate shape. On base end sides of both end portions of the first movable member 4, a pair of mounting portions 4A and 4A formed is bent. In the mounting portions 4A and 4A, shaft-receiving sections 4a and 4a formed are opposite to be each other. Both ends of the first pivotal shaft 16 rotatably fit the shaft-receiving sections 4a and 4a, and the first movable member 4 is rotatably supported around the first pivotal shaft 16 in the frame 15.

In both end portions of the first movable member 4, plate spring-receiving sections 4B and 4B that contact front ends of first plate springs 7 and 7 are formed so as to extend horizontally.

On a back surface of the base end of the first movable member, a notched-fitting section 4b, in which a protrusion 18a of a supporting-block section 18 is integrally protruded from the base end of the shift lever 2, is formed. The back surface of the first movable member 4 is held by the supporting-block section 18, so that the shift lever 2 is supported so as not to be pivoted at the operation reference position in the first pivotal direction (D1 direction) when the shift lever 2 is at the operation reference position. Note that when the shift lever 2 is at the operation reference position, the first movable member 4 is supported by an attraction force between the first magnetic body 5 and the permanent magnets 6 and 6.

On a surface of the first movable member 4, a first magnetic body 5 that is formed of magnetic material such as iron to have a plate shape is integrally joined.

Third Movable Member and Third Magnetic Body

The third movable member 10 is formed of magnetic material such as iron to have a plate shape. Shaft-receiving sections 10a and 10a that are formed on a pair of mounting portions 10A and 10A fit both ends of the first pivotal shaft 16, as with the case of the first movable member 4. The third movable member 10 is rotatably supported at a center of the first pivotal shaft 16 in the frame 15.

On both end portions of the third movable member 10, plate spring-receiving sections 10B and 10B that contact second plate springs 12 and 12 are formed so as to extend horizontally.

A notched-fitting section (not shown) of the third movable member 10 fits a protrusion (not shown) provided on a surface opposite to a side of the protrusion 18a of the supporting-block section 18, at which a base end of the shift lever 2 is integrally protruded. The back surface of the third movable member 10 is held by the supporting-block section 18, so that the shift lever 2 is supported so as not to be pivoted at the operation reference position in the second pivotal direction (D2 direction). Note that when the shift lever 2 is at the operation reference position, the third movable member 10 is supported by an attraction force between the third magnetic body 11 and the permanent magnets 6 and 6. On a surface of the third movable member 10, the first magnetic body 11 formed of magnetic material such as iron to have a plate shape is integrally joined.

Second Movable Member and Second Magnetic Body

The second movable member 8 is formed of resin to have a plate shape. On base end sides of both end portions of the second movable member 8, a pair of mounting portions 8A and 8A is formed so as to be opposed to each other. In the mounting portions 8A and 8A, shaft-receiving sections 8a and 8a are formed so as to be opposite to each other. The shaft-receiving sections 8a and 8a fit both ends of the first pivotal shaft 16, as with the case of the first movable member 4. The second movable member 8 is rotatably supported around the first pivotal shaft 16 in the frame 15.

As described above, the first movable member 4 and the second movable member 8 are pivotally shifted around the first pivotal shaft 16, thereby enabling a smooth pivotal operation of the shift lever 2. Also, the first pivotal shaft 16 is a common pivotal shaft to the first movable member 4 and the second movable member 8, thereby decreasing the number of components and improving the usability of a storage space in the case body 110, as well as decreasing the size.

On front end sides of the second movable member 8, a pair of second magnetic bodies 9 and 9 that is formed of magnetic material such as iron to have a plate shape is arranged in parallel so as to be spaced-apart. The second magnetic bodies 9 and 9 are integrally formed with the second movable member 8.

At front ends of the second magnetic bodies 9 and 9, stopper portions 9A and 9A formed are protruded forwardly. When the stopper portions 9A and 9A contact an upper surface of the third frame section 15C, the second movable member 8 is disposed in a reference state.

On front end sides of the second magnetic bodies 9 and 9, leg portions 9B and 9B are formed upright so as to be opposite to each other. Front ends of the leg portions 9B and 9B are joined by a ring-shaped and horizontally long mounting frame section 9C that is protruded forward.

On a front end side of the second movable member 8, a spring-supporting-leg portion 8B is integrally formed so as to be sandwiched between the leg portions 9B and 9B. A front end of the spring-supporting-leg portion 8B is integrally formed with the mounting frame section 9C. At a front end of the spring-supporting-leg portion 8B, first plate springs 7 and 7 are formed integrally so as to extend in directions of both sides of the second movable member 8. Front ends of the first plate springs 7 and 7 are formed downwardly so as to be on a surface of the second movable member 8. Note that the first plate springs 7 and 7 are preferably formed of resin material for forming elastic deformation. For this reason, the second movable member 8 is formed of POM (polyacetal) or the like, for example.

The second movable member 8 is inserted into a notch portion 4c in which the mounting frame section 9C is formed on a front end side of the first movable member 4. The second movable member 8 also is arranged so as to protrude upwardly from a surface of the first movable member 4. The front ends of the first plate springs 7 and 7 contact plate spring-receiving sections 4B and 4B, and are received by the plate spring-receiving sections 4B and 4B.

As illustrated in FIG. 8, in a central portion of the spring-supporting leg portions 8B, which is formed integrally with the first plate springs 7 and 7 by resin molding, a slit-shaped moving guide section 8C is formed vertically long. In the moving guide section 8C, a protruded linear portion 15b, which is formed upwardly on the third frame section 15C in the frame 15, slidably fits. When the second movable member 8 is pivotally shifted in the first pivotal direction (D1 direction), the moving guide section 8C slides with respect to the protruded linear portion 15a. The protruded linear portion 15b is formed of non-magnetic material such as zinc die-cast, and is formed integrally with the third frame section 15C. In other words, the moving guide section 8C closely fits the protruded linear portion 15b. Thus, without applying a grease, etc. in a fitting portion of the moving guide section 8C which moves with respect to the protruded linear portion 15b, the backlash would not occur, thereby improving a slide operation. Accordingly, the second movable member 8 is pivotally shifted in the first direction (D1 direction) smoothly.

Also, in a sliding portion of the moving guide section 8C which slides with respect to the protruded linear portion 15b, durability can be improved. In addition, the second movable member 8 and the frame 15 can be easily assembled.

Fourth Movable Member and Fourth Magnetic Body

The fourth movable member 13 is formed of resin to have a plate shape. The fourth movable member 13 is formed to have a plate shape. Shaft receiving sections 13a and 13a are formed on mounting portions 13A and 13A, and the mounting portions 13A and 13A fit the first pivotal shaft 16, as with the case of the first movable member 8. The fourth movable member 13 is rotatably supported around the first pivotal shaft 16 in the frame 15.

On a front end side of the fourth movable member 13, a pair of fourth magnetic bodies 14 and 14 is arranged in parallel so as to be spaced-apart. At front ends of the fourth magnetic bodies 14 and 14, stopper portions 14A and 14A are formed to extend horizontally. The stopper portions 14A and 14A contact a lower surface of the third frame section 15C, so that the fourth movable member 13 is disposed at a reference state.

When the shift lever 2 is at the operation reference position, the fourth movable member 13 is supported at the reference state by the attraction between the fourth magnetic body 14 and the permanent magnets 6 and 6.

Front ends of the leg portions 14B and 14B that are formed on front end sides of the fourth magnetic bodies 14 and 14 are joined by a horizontal ring-shaped mounting-frame section 14C.

On the front end side of the fourth movable member 13, a spring-supporting leg portion 13B is integrally formed with the mounting-frame section 14C so as to be sandwiched between the leg portions 14B and 14B. Front ends of the second plate springs 12 and 12 are formed so as to hang down from a surface of the third movable member 10. The second plate springs 12 and 12 are preferably formed of resin material for molding in elastic deformation. For this reason, the fourth movable member 13 is folioed of POM (polyacetal), etc., for example, as with the case of the second movable member 8.

The front ends of the second plate springs 12 and 12 contact the plate-spring-receiving sections 10B and 10B in the third movable member 10, and are received by the plate spring-receiving sections 10B and 10B.

In a central portion of the spring-supporting leg portion 13B that is integrally formed with the second plate springs 12 and 12 by resin molding, a moving guide section 13C is formed, as with the case of the spring-supporting leg portion 8B in the second movable member 8. The moving guide section 13C closely fits a protruded linear portion (not shown) that is foiled on the third frame section 15C. Thus, the fourth movable member 14 can slide without any backlash, as with the case of the second movable member 8.

Permanent Magnet

On back surface sides of the second movable member and the fourth movable member, a pair of permanent magnets 6 and 6 is arranged so as to oppose the pair of second magnetic bodies 9 and 9 as well as the pair of fourth magnetic bodies 14 and 14. The permanent magnets 6 and 6 are formed of neodymium, a samarium-cobalt magnet or the like. The permanent magnets 6 and 6 are inserted from openings 15E and 15E, which are formed in frame portions on both sides of the frame 15, into the frame 15. The permanent magnets 6 and 6 are held so as to be horizontal in the frame 15.

As described above, the first movable member 4 formed of magnetic material such as iron, the first magnetic body 5, the second magnetic bodies 9 and 9 formed of magnetic material such as iron, the permanent magnets 6 and 6, the third movable member 10 formed of magnetic material such as iron, the third magnetic body 11, and the fourth movable member 14 and 14 formed of magnetic material such as iron are arranged. Further, side ends of the first movable member 4 and the third movable member 10 fit the first pivotal shaft 16, so that both of the first magnetic body 5 and the first movable member 4 as well as both the third movable member 10 and the third magnetic body 11 form a path of magnetic flux generated by the permanent magnets 6 and 6, thereby increasing an attraction force with respect to the first magnetic body 5, the third magnetic body 11 and the permanent magnets 6 and 6 as well as an attraction force with respect to the second magnetic bodies 9 and 9, the fourth magnetic bodies 14 and 14 and the permanent magnets 6 and 6.

Action of Shift Operation Device

Next, explanation will be provided for an action of the shift operation device.

FIG. 5 illustrates a state in which the shift lever 2 is supported at the operation reference position. For example, upon the shift lever 2 being pivotally shifted in the first pivotal direction (D1 direction), the shift lever 2 is pivotally shifted such that the position state of the vehicle can shift from the home position H to the first step position F1. In this case, the shift lever 2 rotates about the first pivotal shaft 16 in a clockwise way in FIG. 9. With the rotation of the shift lever 2, the supporting-block section 18 pushes up the first movable member 4 against the attraction force acting between the first magnetic body 5 and the permanent magnets 6 and 6 as well as the biasing force of the first plate springs 7 and 7. Pushing up the first movable member 4 causes the shift lever 2 to be pivotally shifted to the first step position (a state in FIG. 9) in the first pivotal direction (D1 direction) with a click feeling.

FIG. 11 is a chart for explaining an operation load applied on the shift lever 2.

In FIG. 11, a dash-dotted line A indicates a setting case (a case in which the permanent magnets 6 and 6 are only used) where, against the attraction force acting between the first magnetic body 5 and the permanent magnets 6 and 6, only a force acting only in moving the first magnetic body 5 away from the permanent magnets 6 and 6 is applied as the operation load of the shift lever 2. A dash-two dotted line B indicates a setting case (a case in which the first plate springs 7 and 7 are only used) where only the biasing force on the first plate springs 7 and 7 is applied as the operation load on the shift lever 2. A solid line C is directed to a case in which the shift operation device 1 according to the present embodiment is employed. The solid line C indicates a setting case where both of the force of moving the first magnetic body 5 away from the permanent magnets 6 and 6 against the attraction force acting between the first magnetic body 5 and the permanent magnets 6 and 6, and the biasing force of the first plate springs 7 and 7 are applied as the operation load on the shift lever 2.

In the shift operation device of the present embodiment, when the shift lever 2 is pivotally shifted to the first step position in the first pivotal direction (D1 direction), first, as with the case in which the permanent magnets 6 and 6 are only used, as indicated by the dash-dotted line A in FIG. 11, the operation load (a peak load a indicated by a dashed line in FIG. 11) is given by a powerful attraction force that is applied on the shift lever 2. Next, the attraction force between the first magnetic body 5 and the permanent magnets 6 and 6 is decreasing, so that the operation load on the shift lever 2 is decreased sharply. The decreasing operation load is adjusted by the biasing force of the first plate springs 7 and 7, so that a desired operation load (a bottom load b indicated by a dashed line in FIG. 11) is applied on the shift lever 2.

The operation load on the shift lever 2 is adjustably set by changing thicknesses, widths or lengths of the first plate springs 7 and 7.

When the shift lever 2 is pivotally shifted to the first step position in the D1 direction, the operation load on the shift lever 2 does not change sharply, thereby reducing an impact noise generated in pivotally shifting the shift lever 2.

Next, when the pivotal operation of the shift lever 2 is released, the shift lever 2 rotates about the first pivotal shaft 16 in an anticlockwise way in FIG. 9. In this case, with the attraction force between the first magnetic body 5 and the permanent magnets 6 and 6 as well as the biasing force of the first plate springs 7 and 7, the first movable member 4 rotates in the second pivotal direction (D2 direction). As such the supporting-block section 18 is pressed down by the first movable member 4, so that the shift lever 2 is pivotally shifted to the operation reference position.

Next, in order to pivotally shift the shift lever 2 from the first step position (the state in FIG. 9) in the first pivotal direction (D1 direction) to the second step position (the state in FIG. 10) in the first pivotal direction (D1 direction), the shift lever 2 is pivotally shifted in the first pivotal direction (D1 direction). Such a pivotal operation in the first pivotal direction (D1 direction) with respect to the shift lever 2 causes the shift lever 2 to rotate about the first pivotal shaft 16 in a clockwise way in FIG. 9. With the rotation of the shift lever 2, the first movable member 4 rotates about the first pivotal shaft 16 in the clockwise way in FIG. 9, so that the first plate spring-receiving sections 4B and 4B in the first movable member 4 push up the mounting-frame section 9C for the second magnetic bodies 9 and 9 via the first plate springs 7 and 7, against the attraction force between the second magnetic bodies 9 and 9 and the permanent magnets 6 and 6. When the mounting-frame section 9C is pushed up, the second movable member 8 integrally formed with the mounting-frame section 9C is pushed up, so that the shift lever 2 is pivotally shifted to the second step position in the first pivotal direction (D1 direction) with the click feeling.

Note that in a case where a shift lever 2 returns from the second step position in the first pivotal direction (D1 direction) to the first step position or the operation reference position, the pivotal operation in the first pivotal direction (D1 direction) with respect to the shift lever 2 is released. In this case, first, the second magnetic bodies 9 and 9 are attracted by the permanent magnets 6 and 6, and then the shift lever 2 returns to the first step position in the first pivotal direction (D1 direction). Next, the first magnetic body 5 is attracted by the permanent magnets 6 and 6, and then the shift lever 2 returns at the operation reference position.

For the pivotal operation in the second pivotal direction (D2 direction) with respect to the shift lever 2, i.e., the pivotal operation from the operation reference position to the first step position with respect to the shift lever 2, or/and, a motion of the third movable member 10, the third magnetic body 11, the fourth movable member 13, the fourth magnetic bodies 14 and 14 and the second plate springs 12 and 12 in pivotally shifting the shift lever 2 from the first step position in the second direction (D2 direction) to the second positon in the second pivotal direction (D2 direction), detailed explanation will be omitted since they are substantially the same as the motion of the first movable member 4, the first magnetic body 5, the second movable member 8, the second magnetic bodies 9 and 9 and the first plate springs 7 and 7 in pivotally shifting the shift lever 2 in the first direction (D1 direction).

As described above, against the attraction force acting between the first magnetic body 5 and the permanent magnets 6 and 6, the click feeling given by the force of moving the first magnetic body 5 away from the permanent magnets 6 and 6 is adjusted by the biasing force of the first plate springs 7 and 7. Thus, the operation feeling such as a predetermined operation load and operation timing is given in pivotally shifting the shift lever 2 to the first position in the first pivotal direction (D1 direction). Also, the click feeling given against the attraction force acting between the third magnetic body 11 and the permanent magnets 6 and 6 by the force of moving the third magnetic body 11 away from the permanent magnets 6 and 6 is adjusted by the biasing force of the second plate springs 12 and 12. Thus, an operation feeling such as a predetermined operation load and operation timing is given in pivotally shifting the shift lever 2 to the first position in the second pivotal direction (D2 direction). Accordingly, durability and a life span are improved, compared with the case where a click feeling is given by sliding a component as commonly used. In addition, since the permanent magnets 6 and 6 are used, the size is decreased, compared with the case in which a common coil spring is used.

Intermittent-Driving Mechanism

As illustrated in FIG. 12, an intermittent-driving mechanism 20 for pivotally shifting the shift lever 2 in the third pivotal direction (D3 direction) intermittently is disposed between the third frame section 15C in the frame 15 and the case body 110.

The intermittent-driving mechanism 20 includes the shaft-receiving plate 21 mounted together on the case body 110, and a first cam 8D integrally formed with the spring-supporting leg portion 8B at a front edge of the spring-supporting leg portion 8B in the second movable member 8. Also, a second cam 13D is formed at the front edge of the spring-supporting leg portion 8B in the fourth movable member 13.

In an upper end portion of the shaft-receiving plate 21, a first cam-guiding member 22 formed of, e.g., elastomer, which fits the first cam 8D, is integrally formed with the shaft-receiving plate 21. Also, in a lower end portion of the shaft-receiving plate 21, a second cam-guiding member 23 formed of, e.g., elastomer, which fits the second cam 13D, is integrally formed with the shaft-receiving plate 21.

The first cam 8D is pressed to the first cam-guiding member 22 by the attraction force between the second magnetic bodies 9 and 9 and the permanent magnets 6 and 6. Also, the second cam 13D is pressed to the second cam-guiding member 23 by the attraction force between the fourth magnetic bodies 14 and 14 and the permanent magnets 6 and 6.

In the central portion of the shaft-receiving plate 21, a shaft-receiving section 21A that constitutes part of the second pivotal shaft and that is protruded from the third frame section 15C is formed to fit the shaft member 17.

In order to shift the position state of the vehicle from the position H to the position M, the shift lever 2 is pivotally shifted in the third pivotal direction (D3 direction). When the shift lever 2 is pivotally shifted in the third pivotal direction (D3 direction), the frame 15 rotates about the shaft members 17A and 17B in the anticlockwise way in FIG. 12. Upon the frame 15 rotating about the shaft members 17A and 17B in the anticlockwise way in FIG. 12, the first cam 8D and the second cam 13D intermittently move along the surface of the first cam-guiding member 22 and the surface of the second cam-guiding member 23, against the attraction force between the second magnetic body 9 and the permanent magnets 6 and 6 as well as the attraction force between the fourth magnetic bodies 14 and 14 and the permanent magnets 6 and 6.

In this case, in a case where the position state of the vehicle shifts from the position H to the position M, the shift lever 2 is pivotally shifted to a location (a location for the position M) in the third pivotal direction with the click feeling. Note that in a case where the position state of the vehicle returns from the position M to the position H, the shift lever 2 is pivotally shifted in a direction opposite to the third pivotal direction (D3 direction). In such a configuration, the shift lever 2 is pivotally shifted with the click feeling.

The first cam 8D is integrally formed with the second movable member 8, and further, the second cam 13D is integrally formed with the fourth movable member 8. This decreases the number of components. In addition, the intermittent-driving mechanism 20 can be easily assembled.

Note that in a case where the position state of the vehicle shifts from the position M to the position M+, the shift lever 2 is pivotally shifted from a location for the position M to the first step position in the first pivotal direction (D1 direction). In this case, as with the case of the shift lever 2 being pivotally shifted from the reference operation positon to the first step positon in the first pivotal direction (D1 direction), the first movable member 4 rotates with the click feeling. Also, in a case where the position state of the vehicle shifts from the position M to the position M−, the shift lever 2 is pivotally shifted from the location for the position M in the second pivotal direction (D2 direction). In this case, as with the case of the shift lever 2 being pivotally shifted from the reference operation positon to the first step positon in the second pivotal direction (D2 direction), the first movable member 4 rotates with the click feeling.

SUMMARY OF THE EMBODIMENT

As described above, in the shift operation device 1 according to the present embodiment, a click feeling that is given, against the attraction force acting between the first magnetic body 5 and the permanent magnets 6 and 6, by the force of moving the first magnetic body 5 away from the permanent magnets 6, as well as an operation feeling, such as an operation load and operation timing, that is adjusted by the biasing force of the first plate springs 7 and 7, is given in pivotally shifting the shift lever 2 to the first position in the first pivotal direction (D1 direction). Further, a click feeling that is given, against the attraction force acting between the third magnetic body 11 and the permanent magnets 6 and 6, by the force of moving the third magnetic body 11 away from the permanent magnets 6 and 6, as well as the operation feeling, such as an operation load and operation timing, that is adjusted by the biasing force of the second plate springs 12 and 12, is given in pivotally shifting the shift lever 2 to the first position in the second pivotal direction (D2 direction). Accordingly, it is possible to provide the operation device that has excellent durability and increasing a life span as well as decreasing the size.

Also, in the shift operation device 1 according to the present embodiment, changing the thicknesses, the widths or the lengths of the first plate springs 7 and 7 as well as the second plate springs 12 and 12 can adjust the operation load applied on the shift lever 2 as desired.

In addition, according to the vehicular shifting apparatus 100, in the operation device 1, the click feeling given by the attraction force of either of the first magnetic body 5 or the third magnetic body 11 and the permanent magnets 6 and 6 is adjusted by the biasing force of either of the first plate springs 7 and 7 or the second plate springs 12 and 12. Thus, the operation feeling such as a predetermined operation load and operation timing is given in pivotally shifting the shift lever 2, thereby obtaining the operation feeling intended for the vehicle when the shift change operation is performed. Also, when the shift lever 2 is pivotally shifted, the click feeling is given by the attraction force of the permanent magnets 6 and 6.

In the present invention, given that an elastic member for biasing the second movable member is provided, as with the case of the first movable member 4, with the second movable member, an operation feeling, such as an operation load and operation timing, that is adjusted by a biasing force of the elastic member may be given in pivotally shifting the operation member.

Embodiments of the present disclosure provide an operation device and a vehicular shifting apparatus.

A first aspect of an embodiment provides an operation device, including an operation member and a support for pivotally supporting the operation member, and in which the operation member is pivotally shifted to a predetermined position with a click feeling, the operation device including a first movable member supported by the support so as to interlock with a pivotal motion of the operation member, a first magnetic body provided with the first movable member, a permanent magnet supported by the support so as to oppose the first magnetic body when the operation member is at an operation reference position of the operation member, and an elastic member for biasing the first movable member in a direction in which the first magnetic body moves toward the permanent magnet, and wherein the operation member is supported at the operation reference position by an attraction force acting between the first magnetic body and the permanent magnet when the operation member is at the operation reference position, and wherein the movable member positions the first magnetic body away from the permanent magnet against the attraction force acting between the first magnetic body and the permanent magnet as well as a biasing force of the elastic member when the operation member is pivotally shifted to a first step position, so that the operation member is pivotally shifted to a predetermined position.

According to this configuration, against the attraction force acting between the first magnetic body and the permanent magnet, the click feeling given by a force of moving the first magnetic body away from the permanent magnet is adjusted by the biasing force of the elastic member. Further, an operation feeling such as a predetermined operation load and operating timing is given in pivotally shifting the operation member whereby it is possible to provide an operation device that has excellent durability and an increasing life span as well as decreasing the size.

In a second aspect, according to the first aspect, the first movable member may be pivotally supported by a first pivotal shaft mounted on the support.

In such a configuration, the first movable member is pivotally shifted at a center of the first pivotal shaft whereby it is possible to pivotally shift the operation member smoothly.

In a third aspect, according to the first or second aspect, the operation member may be configured to be pivotally shifted, from the operation reference position, in a first pivotal direction and in a second pivotal direction opposite to the first pivotal direction, and wherein the first movable member, the first magnetic body and the elastic member are disposed at positions interposing the permanent magnet in each of the first pivotal direction and the second pivotal direction.

In such a configuration, in a case where the operation member is pivotally shifted in the first pivotal direction and the second pivotal direction, the click feeling given by the attraction force acting between the first magnetic body and the permanent magnet is adjusted by the biasing force of the elastic member, thereby providing the operation feeling such as a predetermined operation load and operating timing in pivotally shifting the operation member.

In a fourth aspect, according to any one of the first through third aspects, Preferably, the operation device may further include a second movable member supported by the support at a location between the first movable member and the permanent magnet, the second movable member being configured to operate in conjunction with the pivotal motion of the operation member, and a second magnetic body provided with the second movable member so as to oppose the permanent magnet, and wherein the operation member is supported at the operation reference position by the attraction force acting between the first magnetic body and the permanent magnet when the operation member is at the operation reference position, and wherein the second movable member positions the second magnetic body away from the permanent magnet against an attraction force acting between the second magnetic body and the permanent magnet when the operation member is pivotally shifted in the first pivotal direction or the second pivotal direction, so that the operation member is pivotally shifted to a predetermined position.

In such a configuration, with the biasing force of the elastic member as well as the attraction force between the magnetic body and the permanent magnet, the operation load, timing or the like with respect to the operation member is set.

In a fifth aspect, according to the fourth aspect, the second movable member may be pivotally supported by the first pivotal shaft mounted on the support.

In such a configuration, the first movable member and the second movable member are pivotally shifted at a center of the first pivotal shaft, thereby pivotally shifting the operation member smoothly.

Also, the first pivotal shaft is a common pivotal shaft to the first movable member and the second movable member, thereby decreasing the number of components and improving the usability of a storage space in the vehicle, as well as decreasing the size.

In a sixth aspect, according to the fourth or fifth aspect, the elastic member may be a resin plate spring integrally formed with the second movable member.

Such a configuration avoids increasing the number of components, and enables low costs as well as easily assembling.

In a seventh aspect, according to any one of the first through sixth aspects, the second movable member is formed of resin, and the second movable member is slidably supported by the support, and may include a moving guide section integrally formed with the second movable member in a sliding portion of the second movable member which slides with respect to the support.

In such a configuration, the second movable member is slidably supported by the moving guide section formed of resin, and thus the second moving member slides without any backlash. Also, the moving guide section is integrally formed with the second movable member in forming the second movable member, thereby avoiding an increasing number of components. In addition, the second movable member and the support are easily assembled.

In an eighth aspect, according to any one of the first through seventh aspects, the operation device may further include a second pivotal shaft for pivotally supporting the operation member in a third pivotal direction perpendicular to the first pivotal direction or the second pivotal direction, and an intermittent-driving mechanism for intermittently driving the operation member in the third pivotal direction, and wherein the intermittent-drive mechanism includes a cam integrally formed with the second movable member.

In such a configuration, in a case where the operation member is pivotally shifted in the third pivotal direction, the cam for providing a click feeling is integrally formed with the second movable member, thereby avoiding an increasing number of components. In addition, the intermittent-driving mechanism is easily assembled.

An ninth aspect provides a vehicular shifting apparatus, including the operation device according to any one of the first through eighth aspects, a control unit configured to transmit a signal to a vehicle-side equipment in response to receiving a signal from the operation device, a shift knob attached to an operation member of the operation device, and a position detecting unit configured to detect a plurality of positions at which the operation member is positioned.

According to this configuration, in the vehicular shifting apparatus, in a case where the operation member is pivotally shifted to a predetermined position, the click feeling is given according to a position with respect to the operation member. The operation member is pivotally shifted based on an operation load, operation timing or the like intended for the vehicle. In addition, the click feeling is obtained with use of the attraction force of the permanent magnet in pivotally shifting the operation member, thereby decreasing the size.

According to the present disclosure, it is possible to provide an operation device and a vehicular shifting apparatus using the operation device in which an operation member is pivotally shifted with a click feeling by use of an attraction force acting between a magnetic body and a permanent magnet as well as a biasing force of an elastic member, so that the operation device and the vehicular shifting apparatus have excellent durability and a decreased size.

The present invention is not limited to the embodiment. It will be appreciated by those skilled in the art that modifications, combinations, sub-combinations, alternative to the components of the foregoing embodiments are made within the scope of the present invention or the equivalent thereof.

What is claimed is:

1. An operation device that includes an operation member and a support for pivotally supporting the operation member, and in which the operation member is pivotally shifted to a predetermined position, the operation device comprising:
   a first movable member supported by the support so as to interlock with a pivotal motion of the operation member;
   a first magnetic body attached to the first movable member;
   a permanent magnet supported by the support so as to be opposite the first magnetic body upon occurrence of a condition in which the operation member is at an operation reference position of the operation member; and
   an elastic member for biasing the first movable member in a direction in which the first magnetic body moves toward the permanent magnet,
   wherein the operation member is supported at the operation reference position by an attraction force acting between the first magnetic body and the permanent magnet, upon occurrence of the condition in which the operation member is at the operation reference position,
   wherein upon occurrence of a condition in which the operation member is pivotally shifted to a first step position, the first movable member positions the first magnetic body away from the permanent magnet against the attraction force acting between the first magnetic body and the permanent magnet as well as a biasing force of the elastic member, so that the operation member is pivotally shifted to a predetermined position,
   wherein the operation member is configured to be pivotally shifted, from the operation reference position, in a first pivotal direction and in a second pivotal direction opposite to the first pivotal direction, and wherein the first movable member, the first magnetic body, and the elastic member are disposed in each of the first pivotal direction and the second pivotal direction, interposing the permanent magnet.

2. The operation device according to claim 1, further comprising a first pivotal shaft mounted on the support, wherein the first movable member is pivotally supported by the first pivotal shaft.

3. The operation device according to claim 2, further comprising:
   a second pivotal shaft for pivotally supporting the operation member in a third pivotal direction perpendicular to the first pivotal direction and the second pivotal direction;
   a second movable member supported by the support at a location between the first movable member and the permanent magnet, the second movable member being configured to operate in conjunction with the pivotal motion of the operation member; and
   an intermittent-driving mechanism for intermittently driving the operation member in the third pivotal direction, wherein the intermittent-driving mechanism includes a cam integrally formed with the second movable member.

4. The operation device according to claim 1, further comprising:
   a second movable member supported by the support at a location between the first movable member and the permanent magnet, the second movable member being configured to operate in conjunction with the pivotal motion of the operation member; and
   a second magnetic body provided with the second movable member so as to be opposite the permanent magnet,
   wherein the operation member is supported at the operation reference position by the attraction force acting between the first magnetic body and the permanent magnet, upon occurrence of the condition in which the operation member is at the operation reference position,
   wherein upon occurrence of a condition in which the operation member is pivotally shifted in the first pivotal direction or the second pivotal direction, the second movable member positions the second magnetic body away from the permanent magnet against an attraction force acting between the second magnetic body and the permanent magnet, so that the operation member is pivotally shifted to a predetermined position.

5. The operation device according to claim 4, further comprising a first pivotal shaft mounted on the support, wherein the second movable member is pivotally supported by the first pivotal shaft.

6. The operation device according to claim 4, wherein the elastic member is a resin plate spring integrally formed with the second movable member.

7. The operation device according to claim 1, further comprising a second movable member formed of resin, wherein the second movable member is slidably supported by the support, and includes a moving guide section integrally formed with the second movable member in a sliding portion of the second movable member which slides with respect to the support.

8. A vehicular shifting apparatus, comprising:
   the operation device according to claim 1;
   a control unit configured to transmit a signal to a vehicle-side equipment in response to receiving a signal from the operation device;
   a shift knob attached to the operation member of the operation device; and a position detecting unit configured to detect a plurality of positions at which the operation member is positioned.

* * * * *